United States Patent [19]

Meidenbauer

[11] Patent Number: 5,215,780
[45] Date of Patent: Jun. 1, 1993

[54] CHOCOLATE COATING CONTAINING NO TROPICAL OILS

[75] Inventor: Arlen R. Meidenbauer, New Berlin, Wis.

[73] Assignee: Eskimo Pie Corporation, Richmond, Va.

[21] Appl. No.: 550,579

[22] Filed: Jul. 10, 1990

[51] Int. Cl.$^5$ .............................................. A23D 9/06
[52] U.S. Cl. ................................ 426/659; 426/99; 426/100; 426/101; 426/606; 426/607; 426/306
[58] Field of Search ............... 426/606, 607, 613, 659, 426/572, 306, 313, 660, 100, 101, 99

[56] References Cited

U.S. PATENT DOCUMENTS

| | | | |
|---|---|---|---|
| Re. 30,722 | 8/1981 | Olds | 426/101 |
| 1,389,947 | 1/1921 | Hechler | 426/606 |
| 2,101,352 | 2/1940 | Oprean | 426/101 |
| 2,430,596 | 11/1947 | Ziels et al. | 426/607 |
| 2,936,238 | 5/1960 | Weiss | 426/607 |
| 3,333,968 | 8/1967 | Bell et al. | 426/313 |
| 3,790,608 | 2/1974 | Caverly et al. | 426/607 |
| 3,959,516 | 5/1976 | Warkentin | 426/631 |
| 4,042,721 | 8/1977 | Ziccarelli | 426/631 |
| 4,086,370 | 4/1978 | Olds | 426/101 |
| 4,183,971 | 1/1980 | Minowa et al. | 426/607 |
| 4,296,141 | 10/1981 | De Paolis | 426/613 |
| 4,316,919 | 2/1982 | Pelloso et al. | 426/607 |
| 4,396,633 | 8/1983 | Tresser | 426/100 |
| 4,414,239 | 11/1983 | Oven | 426/101 |
| 4,430,350 | 2/1984 | Tresser | 426/101 |
| 4,560,563 | 12/1985 | Tresser | 426/101 |
| 4,753,812 | 6/1988 | Wilson et al. | 426/572 |
| 5,011,704 | 4/1991 | Smagula | 426/100 |
| 5,017,392 | 5/1991 | Bombardier | 426/101 |

FOREIGN PATENT DOCUMENTS

| | | |
|---|---|---|
| 23152 | 1/1981 | European Pat. Off. . |
| 59-132860 | 7/1984 | Japan . |
| 63-279752 | 11/1988 | Japan . |
| 663365 | 5/1979 | U.S.S.R. . |

OTHER PUBLICATIONS

Tressler, D. K., and Sultan, W. J., 1975, "Food Products Formulary" vol. 2, AVI Publishing, Westport, Conn., pp. 124 & 125.

Feuge, R. O., 1964, "Confectionery Fats: Their Current Status and Potential Market", J. Am. Oil Chem. Soc., vol. 41, No. 4, p. 4.

*Primary Examiner*—Carolyn Paden
*Attorney, Agent, or Firm*—Nies, Kurz, Bergert & Tamburro

[57] ABSTRACT

A chocolate coating for frozen desserts or the like containing no tropical oils but including a mixture of first and second oils having a different degree of hydrogenation and different melting temperatures and other compatible ingredients.

14 Claims, No Drawings

CHOCOLATE COATING CONTAINING NO TROPICAL OILS

BACKGROUND OF THE INVENTION

This invention relates generally to a chocolate coating for a dairy dessert and more particularly, to a novel chocolate coating low in saturated fats for use in conjunction with a frozen dairy dessert such as an ice cream bar, cone, or the like.

Consumers have become increasingly concerned about the saturated fat content of the foods which they eat and the effect of such foods on their health and general well-being. Saturated fat has been shown to increase levels of cholesterol in the blood and has been linked to heart disease. Prudent consumers thus consciously seek foods having low saturated fat content.

Chocolate coatings for dairy desserts traditionally have been manufactured with tropical oils, particularly coconut oil which is high in saturated fat. Coconut oil has been preferred because of its reasonable cost, its compatibility with chocolate liquors and its neutral flavor which lets the chocolate flavor come through on the finished product. It has a good shelf life and does not have a waxy taste. Coconut oil is also beneficial to the production process since it dries quickly on the frozen dessert and is very compatible with automatic dipping machines used in the manufacturing process.

For various reasons, the prior art has tried to replace at least part of the coconut oil with nonlauric edible oils, and typical proposals are disclosed in U.S. Pat. Nos. 3,333,968; 4,396,633; and 4,430,350. However, formulations such as these have not become commercially acceptable and the use of coconut oil alone remains predominant in the manufacture of chocolate coatings.

In addition, none of the prior art proposals discusses or recognizes the problems associated with saturated fats as contained, for example, in the popular coconut oil and none suggests a suitable replacement for the coconut oil to reduce the saturated fat while, at the same time, retaining taste, flavor, viscosity, blending and processing characteristics similar to those provided by coconut oil.

SUMMARY OF THE INVENTION

Accordingly, the primary object of this invention is to provide a novel chocolate coating particularly useful on frozen dairy desserts, the coating containing no tropical oils and being low in saturated fats.

Another object of the invention is to provide the above novel chocolate coating whose characteristics closely simulate those of a conventional chocolate coating containing coconut oil applied on a frozen dessert bar.

Still another object of the invention is to provide the above novel chocolate coating containing no tropical oils and being acceptable in taste, texture, color, rate of flavor release, mouthfeel, snap, drying time, shelf life, cost, and produceability from a manufacturing standpoint. The characteristics of the chocolate coating of the invention closely simulate those of a conventional control coating containing coconut oil applied to a popular ice cream bar sold by the assignee of this invention.

A further object of the invention is to provide the above novel chocolate coating in which the usual coconut oil is replaced in total by non-tropical oils such as sunflower, cottonseed, and soybean oils proportioned and blended together to provide a chocolate coating product having the desired characteristics noted above.

Still another object of the invention is to provide the above novel chocolate coating containing no tropical oils but instead including a blend of two sunflower oils having different degrees of hydrogenation and different melting points which afford a continuous flavor release effect as the consumer eats the frozen dessert product.

Another object of the invention is to provide the above novel chocolate coating which is low in saturated fats but retains the characteristics necessary for an acceptable product. The coating does not have any off-flavors or impart a waxy taste to the product. The non-tropical oils are bland in flavor and do not mask the flavor of the chocolate ingredients. The proper blend of the non-tropical oils according to the invention satisfy the functional demands of conventional ice cream equipment including proper dry time, viscosity, and thickness of coating deposited on the frozen ice cream bar. The drying time is critical so as not to drip coating on the wraps and to provide a desired thickness of coating on the bar. Viscosity is important because it affects the thickness of the coat and the amount of flavor contributed by the coating. Too thick a coat might taste overly strong to the consumer and too thin a coat produces a weak chocolate flavor. The formulation of the invention satisfies all these criteria and, at the same time, reduces the saturated fat content of the ice cream product which, as noted above, is very desirable for health purposes to many consumers.

Other objects and advantages will become apparent from the following detailed description of the invention.

DETAILED DESCRIPTION OF THE INVENTION

Applicant has found that the usual tropical oil such as coconut oil constituting the fat ingredient in conventional chocolate coatings for frozen desserts can be completely replaced by non-tropical oils such as sunflower, cottonseed and soybean oils. Preferably, the non-tropical oil used includes a blend of two different sunflower oils having different degrees of hydrogenation and different melting points. The non-tropical oil ingredient also preferably includes a third non-tropical oil mixture of cottonseed and soybean oils.

The two preferred sunflower oils are commercially available, high stability monounsaturated oils manufactured by SVO Enterprises of East Lake, Ohio, and marketed under product identification marks Trisun HS-100 and HB-95. Using plant breeding techniques, the manufacturer has been able to increase the amount of monounsaturates from about 17% which is present in regular sunflower oil to about 80% present in the HS-100 and HB-95 oils. The sunflower seeds are harvested and tested, the oil is extracted by heat and pressure and then deodorized to remove off-flavors and smells.

The HS-100 and HB-95 sunflower oils differ in the degree of hydrogenation. The HS-100 oil is lightly hydrogenated by which hydrogen replaces a small number of the double bonds in the triglyceride molecule. HS-100 oil is a product with a high level of monounsaturation and a lower level of polyunsaturation. This is also true of the HB-95 oil, but the HB-95 oil is hydrogenated to a greater amount. As a result, the melting point of the HB-95 oil is greater than the melting point of the HS-100 oil, and the two oils may be blended together in predetermined amounts to provide a desired melting point and also to alter the percent of solids present at different temperatures as measured and indicated by the Solid Fat Index (SFI) as shown in Table 1 presented below. The third non-tropical oil used as part of the fat ingredient in the invention is a blend of cottonseed and soybean oils and preferably is an oil marketed under the product identification mark CIROL by the Durkee Industrial Foods Corporation of Cleveland, Ohio. The CIROL oil is a partially hydrogenated blend of at least 51% cottonseed oil and 49% soybean oil.

The following Table 1 presents the melting characteristics of each of the sunflower oils as they are commercially available, of the blend of the two sunflower oils combined at a ratio of approximately 2 to 1 for use in the coatings of the invention, and of the CIROL cottonseed and soybean mixture. Table 1 also presents the Solid Fat Index (SFI) for the various oils as a measure of the percent of solids present at each indicated temperature.

TABLE 1

|  | Trisun HS-100 | Trisun HB-95 | HS-100/HB-95 Blend | CIROL |
|---|---|---|---|---|
| 50° F. | 6–8 | 42–52 | 24–28 | 28–34 |
| 70° F. | <1 | 33–40 | 11–16 | 14–20 |
| 80° F. | 0 | 25–32 | 6–12 | 8–14 |
| 92° F. | 0 | 10–15 | <5 | <5 |
| 104° F. | 0 | 1 max. | 0 | 0 |
| Melting Pt. | 71° F. | 92–96° F. | 84–86° F. | 91–95° F. |

A number of samples of different formulations were prepared in commercial sized 10000 pound batches and evaluated to produce a chocolate coating low in saturated fats but possessing acceptable eating and processing characteristics noted hereinabove. Table 2 sets forth a number of the formulations which were prepared and evaluated.

added to the mixing tank, again maintaining the mixture in the tank at about 110° F. The mixture is then fed continuously into the milling section where it is milled at about 115° F. temperature for a sufficient period of time to provide a blend of a desired micron size of maximum 0.0009 inch. The remaining oil (except for about 300 pounds) was sent directly to the finishing tank and mixed well with the mixture received from the mill. The 300 pound balance of the oil is used to flush the entire system and then sent on to the finishing tank where it is mixed well with the remaining ingredients while the temperature within the finishing tank is maintained at about 110° F.

In preparing sample 7, the HS-100 and HB-95 oils were pre-blended and about ⅔ of that blend was initially placed into the pre-mix tank. The remaining ⅓ of the blend and all of the CIROL oil was passed to the finishing tank where they were mixed well with the mixture received from the mill.

The various samples were taste-tested by experienced taste panelists who are employees of the assignee of this invention to determine the acceptability of those formulations in matching the conventional chocolate control formulation and measuring the general marketability of those formulations as they relate to flavor, texture, and color. In addition, the formulations were evaluated with respect to their processing characteristics such as viscosity, drying time, blending characteristics, and coating thickness.

Of those formulations tested, samples 6 and 7 were found to be the best, with sample 7 being the preferred.

Samples 6 and 7 had an acceptable viscosity of about 480 cps, a weight per gallon of about 8.87 pounds, and a dry time of 11 seconds after deposition on a frozen dessert. As the coated frozen dessert bars were eaten, the coating had color, flavor, mouthfeel and snap characteristics very close to those of the conventional con-

TABLE 2

| Ingredient | Sample (Weight in Pounds) | | | | | | |
|---|---|---|---|---|---|---|---|
|  | 1 | 2 | 3 | 4 | 5 | 6 | 7 |
| HS-100 Oil | — | 995 | 250 | 3100 | 3100 | 2932 | 2970 |
| Lecithin | 30 | 30 | 30 | 30 | 50 | 50 | 50 |
| Vanilla (4 Fold)* | 50 F.O. | 50 F.O. | 50 F.O. | 50 F.O. | 50 F.O. | 64 F.O. | 64 F.O. |
| Chocolate Liquor Natural | 1200 | 1200 | 1200 | 1400 | 1600 | 1600 | 1600 |
| Chocolate Liquor Dutch | 600 | 600 | 600 | 700 | 600 | 600 | 600 |
| Cocoa-Black | 150 | 150 | 150 | 100 | 100 | 100 | 100 |
| Salt (Fine Flakes) | — | — | — | — | 10 | 13 | 13 |
| Milk Solids Non-Fat | 400 | 400 | 400 | — | — | — | — |
| Powdered Sugar-6x | 2750 | 2750 | 2750 | 2800 | 2800 | 2800 | 2800 |
| HB-95 Oil | 3895 | 3100 | 4665 | 1515 | 1335 | 1500 | 1500 |
| CIROL Oil | 1000 | 800 | — | 400 | 450 | 450 | 420 |
| Approximate Total Weight (Lbs) (Not including Vanilla) | 10025 | 10025 | 10045 | 10045 | 10045 | 10045 | 10053 |

*Weight in fluid ounces (FO)

The various samples were prepared in a commercially available milling system, the high production RED HEAD ball milling system, manufactured by Chicago Boiler Company which is capable of producing about 100 pounds per minute of coating. In this commercial system, about ⅔ of the oils are added to a pre-mix tank and mixed with the lecithin and vanilla. Next, the salt, milk solids and sugar were added and mixed well in the tank while maintaining the temperature of the mixture at 100° F. The chocolate liquors were pre-melted at a temperature of about 130° F. and trol formulation.

The other samples were not quite as good as samples 6 and 7° F.or example, samples 1 and 2 had a high viscosity, oily taste, and waxy mouthfeel. Sample 3 had a weak snap and too thick a coat. Sample 4 was weak in flavor and had slight snap. Sample 5 had weak flavor and a high dry time of 13 seconds.

As mentioned previously, by properly blending the two different sunflower oils, HS-100 and HB-95, the melting point of the blend and coating can be altered as well as the percent of solids present at different temperatures. These two characteristics directly affect the ultimate flavor release, taste, and mouthfeel of the coating. The preferred mixture of sample 7 provides a continuous flavor release effect in the mouth of a person as the temperature of the coating rises up to its melting point. The presence of the third oil, the CIROL oil, controls the brittleness of the coating which provides the desired snap that is evident when eating the dessert bar.

In contrast, the conventional bar containing only coconut oil has an instantaneous flavor release at its melt temperature of about 70° F. In addition, the conventional coating containing coconut oil sets up in about 12 seconds and is fully set when it leaves the coating machine.

In contrast, the coatings of this invention are not fully hardened when they leave the coating machine, but are more flexible and thereby avoid cracking of the coating as the frozen bars are handled during subsequent wrapping and packaging operations.

Table 3 illustrates the differences in the saturated and unsaturated fat ratio of the oils used in this invention, particularly in sample 7, as compared to conventional coconut oil. Table 3 identifies the Fatty Acid Composition of the various oils as follows:

TABLE 3

|  | Trisun HS-100 | HB-95 | HS-100/HB-95 Blend (Sample 7) | CIROL | Coconut Oil |
|---|---|---|---|---|---|
| % C16:0 | 4 | 5.2 | 4.5 | 20 | 45.4 |
| C18:0 | 6 | 7.8 | 8.0 | 5 | 18.0 |
| C18:1 | 87 | 85.7 | 83.0 | 63 | 7.5 |
| C18:2 | <1 | 0.2 | 1.5 | 11.5 | 0 |
| C20:0 | 1 | 0 | 0 | 0 | 10.5 |
| C20:1 | 0 | 0 | 0 | 0 | 2.3 |
| C22:0 | 1 | 1.1 | 0 | 0 | 0.4 |

The numbers 16:0 mean a 16 carbon molecule with 0 double bonds while 18:1 is an 18 carbon molecule with 1 double bond, with a molecule having a double bond being unsaturated. No double bonds indicates a saturated molecule. The molecule in fats is known as a triglyceride.

The most important numbers in Table 3 are C16:0 and C18:0. Both are saturated fats and are present in a high percentage in coconut oil as compared to the HS-100/HB-95 Blend employed in the invention. C18:1 is unsaturated and is present in a very low level in coconut oil as compared to the high level in the HS-100/HB-95 Blend. This Table establishes how replacement of the conventional coconut oil with the sunflower, cottonseed, and soybean blends substantially lowers the level of saturated fats in the resultant chocolate coating.

The chocolate coatings formulated according to the invention do not sacrifice any of the desired eating characteristics but, to the contrary, have very good taste, flavor, mouthfeel, and snap to the consumer. In addition, the coatings readily satisfy the functional demands of conventional ice cream manufacturing equipment and present no problems during the manufacturing process.

Various modifications in the coating formulations may be made. For example, the sugar may be replaced by aspartame (NutraSweet) and a suitable bulking agent.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A chocolate composition for coating frozen desserts comprising a vegetable oil ingredient free of tropical oils and including a mixture of first and second vegetable oils having different degrees of hydrogenation and different melting temperatures, said second oil having a higher melting temperature than said first oil and said mixture including more of said first oil than said second oil, chocolate, and other compatible frozen dessert coating ingredients, said composition having characteristics of texture, mouthfeel, viscosity and drying time which render it useful as a coating for frozen desserts.

2. The coating fo claim 1, said first and second oils being sunflower oils.

3. The coating of claim 2, wherein said first and second oils are blended at a ratio of approximately 2/1 by weight.

4. The coating of claim 3, wherein the melting temperature of said first oil is approximately 71° F. and the melting temperature of said second oil is approximately 92°–96° F.

5. The coating of claim 4, wherein the melting temperature of said mixture approximately 84°–86° F.

6. The coating of claim 2, wherein the melting temperature of said first oil is approximately 71 F and the melting temperature of said second oil is approximately 92°–96° F.

7. The coating of claim 1, wherein the melting temperature of said first oil is approximately 71° F. and the melting temperature of said second oil is approximately 92°–96° F.

8. The coating of claim 1, wherein said fat ingredient is approximately 40–50% by weight and said chocolate ingredient is greater than 10% by weight.

9. The coating of claim 1, said fat ingredient including a third oil having a different degree of hydrogenation and a different melting temperature than said mixture of said first and second oils.

10. The coating of claim 9, wherein said third oil is a mixture of cottonseed and soybean oils.

11. The coating of claim 10, comprising about 44% of first and second oils and about 4% of said third oil.

12. The coating of claim 11, comprising an amount of said chocolate ingredient greater than 10%.

13. The coating of claim 1, comprising about 44 to 50% of said fat oil ingredient and an amount of said chocolate ingredient greater than 10%.

14. The coating of claim 1, wherein the SFI of said oil mixture is greater than 11 percent at a temperature of 70° F.

* * * * *